Oct. 21, 1958    W. A. KOSTICK ET AL    2,857,061
CAR UNLOADER
Original Filed Feb. 2, 1954    4 Sheets-Sheet 1

INVENTORS
WALTER A. KOSTICK
ANDREW P. W. BUCK
BY
Williamson, Williamson, Schroeder, & Adams
ATTORNEYS Oct. 21, 1958 W. A. KOSTICK ET AL 2,857,061
CAR UNLOADER
Original Filed Feb. 2, 1954 4 Sheets-Sheet 2

INVENTORS
WALTER A. KOSTICK
ANDREW P.W. BUCK
BY
Williamson, Williamson, Schroeder & Adams
ATTORNEYS Oct. 21, 1958  W. A. KOSTICK ET AL  2,857,061
CAR UNLOADER
Original Filed Feb. 2, 1954  4 Sheets-Sheet 4
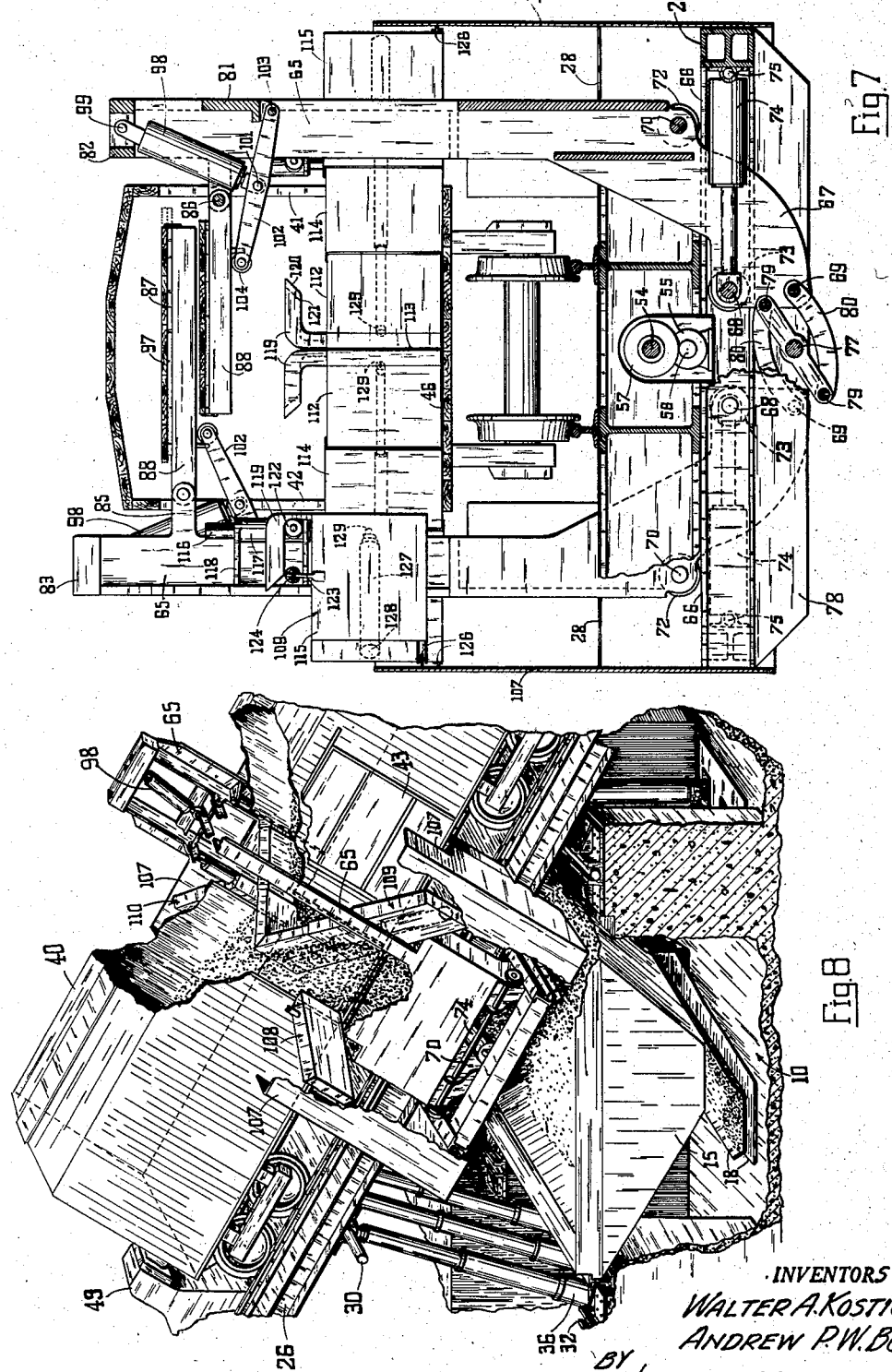
INVENTORS
WALTER A. KOSTICK
ANDREW P. W. BUCK
BY
Williamson, Williamson, Schroeder, & Adam
ATTORNEYS

United States Patent Office 2,857,061
Patented Oct. 21, 1958

2,857,061

CAR UNLOADER

Walter A. Kostick, Minneapolis, and Andrew P. W. Buck, St. Paul, Minn., assignors to Air-O-Flex Equipment Company, Minneapolis, Minn., a corporation of Minnesota Original application February 2, 1954, Serial No. 407,748. Divided and this application April 23, 1956, Serial No. 580,693

4 Claims. (Cl. 214—47)

This invention relates to car unloading and, more particularly, to an apparatus for unloading a conventional boxcar and for removing material such as grain from the boxcar by gravity flow through the side doors thereof. This case is divided from our co-pending application, Serial Number 407,748, filed February 2, 1954, and now abandoned.

Several mechanical methods have been proposed for unloading material such as grain from boxcars. One method employs a suction tube which will draw the material from the car up through a hatch and another common method requires tilting the boxcar to one side and then endwise in order to spill the grain out of the door into collecting and conveying equipment located therebelow. Where no special apparatus is provided at all it is, of course, necessary for the operator to provide hand labor to push the grain from the ends of the boxcar toward the open door and into the receiver.

Prior art mechanical methods have proved unsatisfactory since the equipment used is expensive and the labor in connection with the use thereof is substantial. Furthermore, tilting the boxcar to the side places a great amount of stress on the box construction, oftentimes causing an old car to break and collapse. Where the car is tilted from side to side, special housing facilities must be constructed to permit the movement in both directions. It, therefore, becomes impossible to use the side tilting method to unload a boxcar in conjunction with the standard pits such as are constructed underneath trackage adjacent grain elevators.

The present invention contemplates, as an important object thereof, the provision of apparatus for unloading a boxcar by tilting the car in endwise relation over an unloading pit and simultaneously deflecting the material from the upper end of the boxcar outwardly through both of the doors.

It is another object of the invention to provide unloading apparatus which will accommodate all standard sizes of boxcars irrespective of their variance in dimensions.

It is another object of the invention to provide guiding means for deflecting grain downwardly and outwardly through the open doorways of the car, the guiding means being projected angularly through the doorway of the car, then tilting the forward projecting end of the guiding means along with the boxcar to effect removal of bulk material disposed therewithin outwardly and downwardly from the open car doors.

A further object of the invention is to provide an endwise tilting mechanism for a boxcar loaded with bulk material with deflectors inserted in upwardly apexed V-shape manner so that the bulk contents of one end of the boxcar can be entirely removed simultaneously through both side doors following which V-shaped deflectors are then inserted with their common apex in the opposite direction and with the car tilted reversely to empty the other end.

It is a still further object of the invention to provide apparatus of the class described in which vanes are caused to project through each side door of a boxcar with a minimum of material displacement to produce deflector means for complete and efficient removal of the bulk material from the car, yet maintaining an entirely balanced condition of the boxcar during the unloading operation.

These and other objects and advantages of our invention will more fully appear from the following description, made in connection with the accompanying drawings wherein like reference characters refer to the same parts throughout the several views and in which:

Fig. 1 is a side elevation of our car unloader showing a boxcar positioned thereon and overlying the pit. Portions of the structure are cut away to better show the internal cooperation of other parts, and portions of the pit are taken in vertical section to permit viewing of the structure disposed therein. The position of the car during unloading from one end is shown in dotted line, as is one of the car positioning abutments;

Fig. 2 is a top plan view of our car unloader with the boxcar removed therefrom. Certain of the hidden structure is indicated in dotted lines;

Fig. 3 is an end view of our car unloader taken on the line 3—3 of Fig. 1, portions of the structure being shown in dotted line configuration;

Fig. 4 is a vertical section of our car unloader with a boxcar positioned thereon and taken on the line 4—4 of Fig. 2. Portions of the structure are cut away and others are shown in dotted line configuration;

Fig. 5 is an enlarged and segmented view of the door breaking and retaining mechanism taken in vertical section on the line 5—5 of Fig. 1, the pressure plate being moved inwardly against the door sections preparatory to breaking them loose at one side of the car. The upper position of the pressure plate and retained door sections is shown in dotted line;

Figure 6:
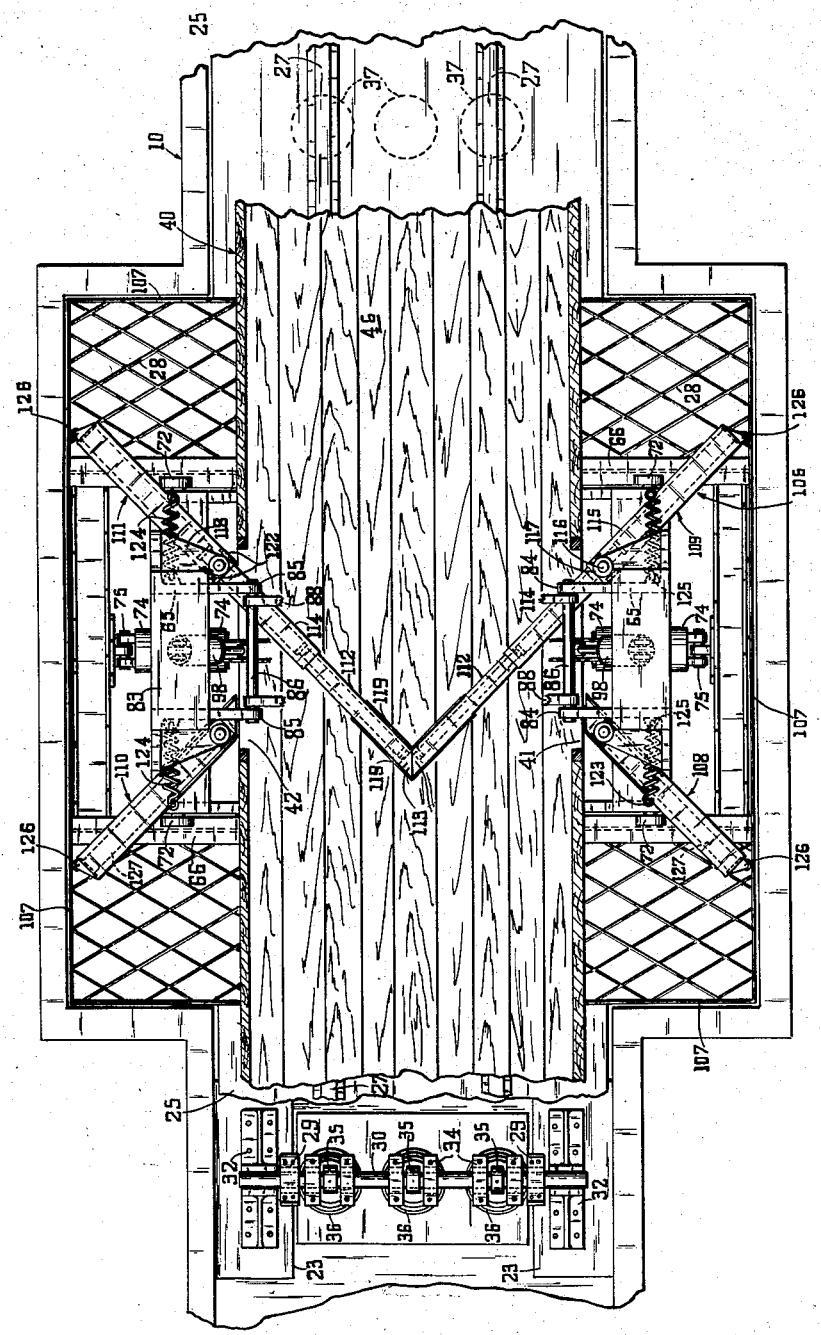

Fig. 6 is an enlarged detail of the material penetrating and guiding vane mechanism taken from the top, as in Fig. 2, a boxcar being positioned on the unloader and horizontally sectioned and segmented to disclose the relationship between the floor and doorways with respect to the mechanism. The door sections have been removed and one pair of vanes inserted into the boxcar preparatory to tilting the car. Portions of the structure are broken away to reveal hidden parts and other hidden parts are indicated in dotted line configuration;

Fig. 7 is an enlarged vertical section of our device and showing details of the door breaking and retaining mechanism, as well as the material penetrating and guiding vane mechanism, in extended position. Portions of the structure are cut away and others are shown in dotted line. The door sections are moved to upper retained position and an opposed pair of vanes are inserted into the car in apexed relation; and Fig. 8 is a schematic representation in perspective of a boxcar in upended angulation, the bulk material therein being unloaded from one end thereof. Unessential portions of the structure are cut away to better show the relationship and operation of the parts.

Figure 1:
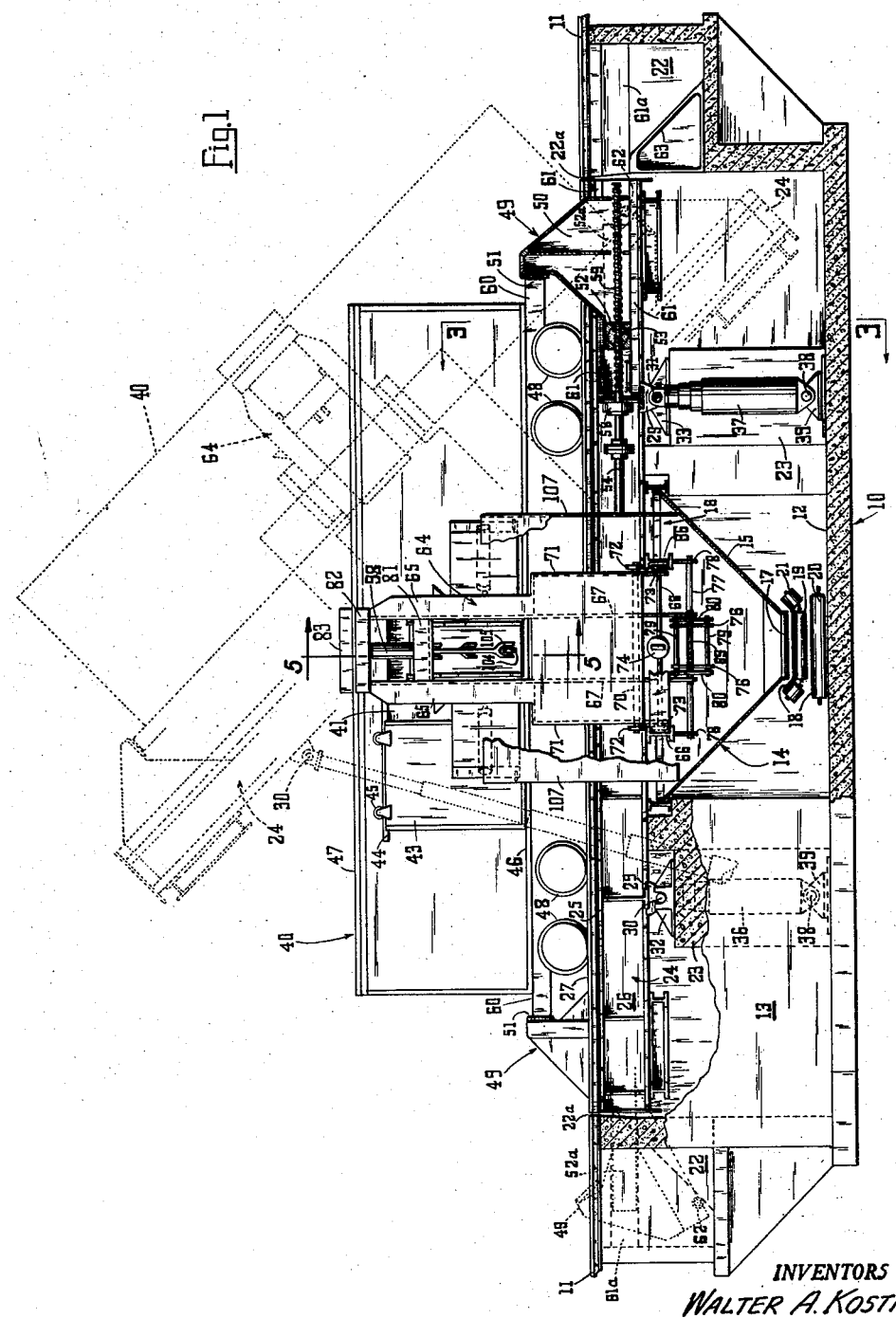

Referring to the drawings and particularly to Fig. 1, the general over-all plan of our car unloader is there shown. It is contemplated that our car unloader be adaptable to use with conventional grain elevators having trackage extending adjacent the elevator and having a pit structure formed therebeneath. It is contemplated further that our unloading device may be installed over such conventional pit structures with but a minimum of changes thereto and requiring no alterations under normal circumstances in the superstructure overlying the trackage and constituting a part of the conventional grain elevator. It is, of course, understood that our car unloading device may be employed independently of any elevator structure and is applicable to any situation or location where it is desired to unload grain cars and the like with a minimum of effort and expenditure.

The main elements of our invention will be treated under separate headings.

Pit structure

The pit structure, as just noted, can be adapted to present unloading pits without requiring the dimensions thereof to be enlarged. Such consideration is in contradistinction to other types of car unloaders which require deepening of the pit because of pivotal construction at the center of the car, and because of the requirement in some instances, of sideways pivoting over an extended width. The pit structure is indicated generally at 10 and is aligned with trackage 11, as shown in Figs. 1 and 2. The pit is preferably lined with concrete and provides a bottom 12 and upstanding walls 13 thereabout. The central portion of the pit is preferably enlarged at each side so as to accommodate the material receiving and conveying device 14, which usually extends laterally from the pit and to further mechanism for elevating or otherwise disposing of the material which has been unloaded. The outline of the enlarged central portion is shown in Fig. 2 in top plan view. The material receiving and conveying device 14 comprises a bin structure 15 having sloping side walls and terminating in an open mouth 16 at the upper portion and terminating in a restricted spout 17 at the lower end thereof. The spout 17 may overlie a traveling belt 18 which is supported in endless roller fashion upon the rollers 19 and 20, the side edges of the flexible belt 18 being supported in upstanding manner on the side rollers 21. It is understood, of course, that other means of receiving and conveying may be employed in the place of mechanism 14. For example, a screw type of conveyor could be employed for effecting lateral movement of the bulk material as it is unloaded into the pit. In addition to the enlarged medial area of the pit structure 10, we utilize a shallow well construction 22 at each end of the pit 10, the well construction being adapted to receive the abutment members which center and hold the boxcar during tilting of the car. The wells 22 thus permit the abutments to lie out of contact with any structure above the trackage 11 when the unloader is not in operation. Details of this structure will be given under the next heading.

Also forming a part of the special construction to be used in connection with our car unloader are the concrete supports 23, of which there are four in number, one pair lying in spaced relation to one side of the pit center and the other pair lying to the other side of the pit structure in equally spaced relation. The tops of the concrete supports or pillars terminate below the top plane of the pit as shown in Fig. 3. The concrete walls 13, the floor 12, and the supports or pillars 23 are all designed to accommodate the heavy weight of the supported structure comprising our invention, as well as the total weight of a loaded boxcar.

Car supporting and end raising element

Mounted in rockable interfitting relation with the pit structure 10 is the car supporting and end raising element shown generally at 24, special reference being had to Figs. 1, 2 and 3. The element 24 has a main body constituting a platform 25 which is generally flat and co-planar with the top of the pit structure 10 when in horizontal position, as shown in Figs. 1-3. The platform 25 is supported by rigid beam members 26 which form a supporting structure for the upper surface 25 of the platform. It is preferred to have an extra strong I-beam as one of the supporting members 26 underlying each of a pair of rails 27 which are secured, in turn, to the element 24 and are closely aligned with the general trackage 11. An outer peripheral frame 26a is adapted to interfit in the enlarged medial area of pit structure 10 and further supports a grill work 28 which covers a central opening overlying the bin 15. The supporting members or beams 26 carry a pair of spaced bearings 29 at each side of the open grill work 28. Each pair of bearings 29 have a shaft extending thereacross, the shaft at the left as viewed in Fig. 1 being indicated by the numeral 30 and the shaft to the right by the numeral 31. Each of the shafts extends through its respective bearing members for a short distance and these ends are adapted to engage the cradle bearings 32 at the left and 33 at the right as viewed in Fig. 1. Each of the pairs of cradle bearings are mounted on a respective pair of concrete pillars 23 as previously described, in connection with the pit structure. Additional bearing members 34 may be secured to the beam structure 26 as shown in Fig. 3 and are further adapted to retain in pivotal relation the uppermost section 35 of each of the hydraulic ram assemblies 36, at the left and 37 at the right as shown in Figs. 1 and 3. The lower portion of each of the hydraulic rams 36 are pivotally mounted at 38 to support bearings 39. An identical pivotal mounting is effected at the right of the pit 10 with the hydraulic rams 37 being pivotally mounted at 38 to the same type of support bearings 39 as shown in Fig. 1. It will be noted that the cradle bearings 32 and 33 are adapted either to providing a stop for the extending ends of shafts 30 and 31 and provide a pivotal support for either of the same shaft extension, depending on which one of the ends of the car supporting and end raising element 24 is advanced upwardly by the respective sets of hydraulic rams 36 or 37. Any extensible and retractable means may be employed for raising the ends of the element 24 but we prefer the hydraulic rams as shown, either singly or with a plurality of hydraulic rams for each end. The means for supplying power to the extensible and retractable devices are not shown but it is understood that any source of power may be employed and that ordinary hydraulic lines for supplying controlled pressures of hydraulic fluid to the rams 36 and 37 may be employed. Since it would be unsafe to raise both ends of the car supporting and end raising element 24 at the same time, we may provide a single control element (not shown) for the rams 36 and 37 which can be actuable for raising only one end of the element 24 at a time and preventing the actuation of the other end. Such feature will provide a safety factor in the operation of the unloader.

It will be noted that the particular spacing and positioning of the hydraulic rams 36 and 37 as well as the cradle bearings 32 and 33 constitutes an important feature of our invention. The selected locations tend to minimize the degree of depression of each end of element 24 when the opposite end is in raised condition. It is for this reason that we can obtain the necessary degree of angulation in raising the car supporting and end raising element while not requiring the upper end to be unusually high in the air, nor to require the lower end to be unusually deep in a pit. Further our lifting arrangement does not require a large amount of power even when adopting our invention to a standard pit structure. It should be noted that the particular spacing of the pivoting positions is such as to result in good balance throughout the raising and lowering as well as during unloading of the car.

The boxcar which is accommodated by our unloader is indicated generally at 40 and may be of any conventional type having doorways 41 and 42 at each side thereof, the said doorways being adapted to receive door sections such as grain doors which are usually nailed to the doorway from the inside of the car. An outer sliding door 43 is provided for each of the doorways 41 and 42 and these may be mounted on a rail 44 at each side of the boxcar on trolley assemblies 45 as shown in Fig. 1. Our invention will accommodate all conventional boxcars regardless of the height of the car floor 46 above rails 27 and regardless of the height of the car top 47 or of the over-all length of boxcar 40. The wheels 48 of the boxcar 40 are adapted to roll normally onto the tracks 27 disposed on the car supporting and end raising element with the boxcar, positioned approximately medially of the platform.

Means for finally centering the boxcar and for preventing movement of the car during tilting thereof comprise a pair of abutment members 49, one disposed at each end of the car supporting and end raising element. The abutment members 49 may be heavy castings having a hollow central portion 50 and provided with an abutting head 51 as shown in Fig. 1. The abutment members 49 are each equipped with a bearing block 52 which in turn has a pair of horizontally fixed locking bars 52a and a transversely extending shaft 53 rotatably journaled therewithin. A longitudinal shaft 54 extends for the length of the element 24 and is powered at a medial location by the motor 55 which drives shaft 54 through pinion gear 56 and the driven gear 57, the latter being rigidly secured to shaft 54. Bearings 58 may rotatably support the shaft 54 and are secured to the car supporting and end raising element 24 with their axes in spaced parallel relation with the tracks 27 as shown in Figs. 1 and 7. The ends of the shaft or rod 54 are threaded as at 59, one of the threaded ends bearing a right hand thread and the other a left hand thread. Motor 55 is reversible so as to advance both of the abutments 49 in convergent manner when operating in one direction and to retract the abutments divergently when rotating in the other direction. The full line showing of the abutments 49 in Fig. 1 represent the fully abutted convergent relation with the boxcar 40 firmly centered and held against displacement from between the abutments. The motor 55 may be provided with automatic stop means which will de-energize and brake the motor when a predetermined degree of pressure has been attained between the abutments 49 and the lower framework 60 of boxcar 40. During non-use of our unloader, the abutments 40 may be moved divergently into lowered position within the respective wells 22. This movement is accomplished through sliding and rolling relation on a pair of tracks 61 which are supported upon the beam structure 24 as shown in Fig. 1. The bearing block 52 rests slidably on the tracks 61 at the inward end of each of abutments 49 and a pair of rollers 62 are journaled for free rotation at the outward ends of each of the abutments 49 and likewise contact the tracks 61. A track extension or guide way 61a is formed at each side of well 22 and in alignment with track 61. An outwardly and downwardly angled pair of track members 63 are positioned in each of the wells 22 and have their upper ends in mating relation with the respective pairs of tracks 61. As the abutments 49 are forced divergently, the rollers 62 will follow the tracks 63 in declining relation while the transversely extending shaft 53 pivots within the bearing block 52. When the longitudinal shaft 54 has rotated with its threaded end 59 in threadable relation with the transverse shaft 53 a sufficient number of turns to position the abutment 49 as shown by dotted lines in the well 22 at the left of pit 10 as shown in Fig. 1, then the abutment will clear the under framework 60 of the boxcar 40 so that the boxcar may be placed or removed upon the supporting platform 25 as desired, the locking bars 52a extending across the gap 22a and locking the supporting platform together with the pit structure 10.

*Door breaking and retaining mechanism*

The door breaking and retaining mechanism is indicated generally at 64 as shown in Fig. 1 and constitutes mechanism which is mounted at both sides of the car supporting and end raising element 24 by means of uprights or supports 65 which in turn are supported on I-beams 66 rigidly supported in spaced parallel depending relation from the bottom of framework 26 as shown in Fig. 1. The I-beams 66 also provide track means for moving the uprights 64 divergently and convergently away from and toward the sides of boxcar 40. The uprights 65 have inwardly extending plate members 67 which lie closely adjacent the inside edges of the I-beams 66 in spaced relation at each side of car 40 as shown in Figs. 1, 4, and 7. Each pair of plates 67 have positioned thereacross a rod or shaft 68. A shaft 70 is likewise journaled across each upright 65 at the side panels 71 which extend inwardly at the side edges of each of the uprights 65. Each of the shafts or rods 68 and 70 extend beyond the journaled supports and the shaft 70 is provided with a supporting castor 72 at each end, the castor 72 resting on the upper surface of each of the I-beams 66, as shown in Figs. 1 and 4. The shaft 68 has a similar castor 73 secured at each outer extension thereof which is adapted to ride upon the inside lower portion of each I-beam 66 as shown in Figs. 1 and 4. An extensible and retractable power element such as the hydraulic ram 74 is secured at 75 to each side of the unloader and in rigid relation to the supporting framework 26 while each extensible inwardly extending member thereof is secured to rods 68 respectively as shown in detail in Fig. 7. Both pairs of flanges 67 are tied together underneath framework 26 by the spaced toggle arms 76, which are, in turn, diametrically mounted on a shaft 77 which is mounted parallel to the shafts 68 and 70 and across depending bracket members 78 which are secured in spaced relation to the under side of the supporting beams 66. The corresponding outer ends of the toggle arms 76 are interconnected by short cross rods 79 which, in turn, pivotally support the two pairs of connecting arms 80, as shown in Fig. 7. The two pairs of connecting arms 80 each extend diametrically in the opposite direction and are pivotally connected with the rods or shafts 69 which were, as previously noted, secured across each pair of flanged members 67. Again the means for extending and retracting the opposed pair of uprights 65 may have power means (not shown) to operate them inwardly and outwardly from the sides of boxcar 40. Thus, where hydraulic rams 74 are employed, a source of hydraulic power with interconnecting hydraulic lines is to be supplied. The toggle arms do not serve to impart driving force to the uprights 65 but cause the uprights to travel in unison when the power means is actuated in either a forward or reverse direction. The I-beams 66 serve as track members for the roller elements 72 and 73 and serve to maintain the directional travel of the two uprights 65 in perfectly aligned relationship.

The upper portion of each of the uprights 65 comprises a pair of standards 81 which are rigidly secured in spaced relation on each of the uprights 65 and are further provided with rigid cross supports 82 and 83 respectively on the right and left uprights 65, the cross members 83 being located at a slightly elevated position with relation to the cross member 82 for a purpose to be presently described. Each of the uprights 65 have a pair of inwardly extending brackets 84 and 85 on the uprights to the left and right respectively as viewed in Figs. 4 and 7, the brackets 85 being positioned slightly higher than the brackets 84. Journaled across the brackets 84 is a shaft 86 from which depends in pivotal swinging relation a rigid pressure plate 87, the pressure plate 87 being slidably mounted on the frame 88 which, in turn, is mounted at its upper ends upon the shaft 86. A trip latch 89 is secured to the frame 88 through a pivotal connection 90, the trip latch 89 having a feeling finger extension 91 which extends forwardly of pressure plate 87 and to one side thereof while the catch portion 92 underlies the under edge of the pressure plate as shown in Fig. 5. The latch 89 has a laterally extending radial arm 93 having an opening through which rod 94 extends in loose relationship, the rod 94 being rigidly secured to a mounting bracket 95 which, in turn, is fastened to frame 88. A compression spring 96 is interposed between the bracket 95 and the laterally extending portion of latch 89 and surrounds the rod 94 so as to constantly urge the radial or lateral arm 93 in a clockwise direction around the pivot pin 90 for urging the latch in supporting relation under the pressure plate 87 until such time as the latch engages one of the door sections 97 which are secured to the inside of doorway 41 as shown in Fig. 5. The identical pressure plate and arm mechanism may be supplied at the left side of car 40 as viewed in Figs. 3, 4, and 7, with the exception of the relative heights therebetween, the entire pressure plate mechanism being higher at the left side than at the right. Referring now to Fig. 4, an extensible and retractable power means such as hydraulic ram 98 is pivotally suspended at 99 from the cross brace 82 on the right upright 65 and an identical ram may be similarly supported to the left upright 83. A slidable rod extension 100 projects from the ram 98 and is pivotally secured through a clevis connection at 101 intermediate the ends of a cam arm 102 on each of the uprights 65. The cam arm 102 is pivotally mounted at 103 to the upright standards 81, as shown in Figs. 1, 4, and 7. The outer end of cam arm 102 bears a cam roller 104 which is freely rotatable in a clevis 105 as shown in Fig. 1. The cam roller 104 and arm 102 are shown in Fig. 5 in rolling contact with the outer surface of frame 88 so as to exert clockwise movement of frame 88 and the pressure plate 87 about the pivotal point 86 at the right hand upright 65 shown in Fig. 5 and a similar structure is mounted to the left upright 65 as shown in Fig. 4, the direction of rotation of the pressure plate being counter-clockwise as viewed in that figure. Again, it is understood that a source of power such as hydraulic supply lines may be connected to ram 98. Referring to Fig. 7, it will be noted that when the hydraulic rams 98 are actuated upwardly, the loose door sections 97 at each side of the car will be moved inwardly toward the inside top of car 40. The higher of the pressure plates 87, at the left as viewed in Figs. 4 and 7, will automatically place it in overlapping relation with the pressure plate of the right side. In order to prevent the door breaking and retaining mechanism from colliding as the pressure plates are urged inwardly, it is necessary to operate the plates sequentially, causing the hydraulic ram 98 to the left to first carry the door sections 97 in proximity to the ceiling of car 40, then following with the pressure plate at the right to bring the door section from the right side of the car into underlying relation with the first named pressure plate. It is preferred that pointed elements such as the pins 105 be attached to the surface of each of the pressure plates 87 so that the door sections 97 will become impaled thereon and retained during the upward movement of the right and left pressure plates. In the event a door section drops off the pressure plate during its upward swinging movement, no harm will result since the material can flow therearound or, in the event the section should actually fall out of the doorway 41 or 42, it will be retained by the grill work 28 and prevented from entering the receiving hopper 15. Referring to Fig. 5, it will be noted that an abutment 87a on the pressure plate 87 will be engaged by roller 104 and pressure plate 87, together with door sections 97 will be pulled outwardly on frame 88 until latch 89 is automatically reset, the spring 96 causing the portion 92 to again underlie pressure plate 87.

*Material penetrating and guiding vane mechanism*

Referring now to the Figs. 2, 6, and 7, the material penetrating and guiding vane mechanism is indicated generally at 106. The mechanism 106 is mounted on the same upright mounting structure 65 that supports the door breaking and retaining mechanism. In addition, a rigid sheathing plate 107 is rigidly secured to the beam structure 26 of the car supporting and end raising element 24 and supplies the multiple purpose of providing an encasing guard for the mechanisms attached to the upright supports and also provides a flat bearing surface for rolling contact at the rearward end of the vanes themselves as will be presently described. The guiding vanes are four in number, two being located on each of the upright supports 65 and angulated with respect to one another as shown in Fig. 2, guide vanes 108 and 109 being located at one side and guide vanes 110 and 111 being located at the other side of our unloader. The guide vanes are extensible and retractable and are preferably formed of a plurality of telescoping rectangular members, the innermost section 112 in each case being projectible the farthest outwardly and having a beveled outer edge 113 as shown in Fig. 6. The next section 114 of each of the guide vanes receives the outermost section 115 which has an upstanding shaft 116 rigidly secured to the top thereof as shown in Fig. 7. Each of the shafts 116 on each of the innermost vane sections is rotatably and slidably retained in a sleeve bearing 117. The sleeve bearing 117, in each instance, is mounted between spaced brackets 118, the brackets 118 being rigidly secured to the uprights 65 in paired relation at each side of the unloader. Each of the guide vanes 108 through 111 is adapted to be retained at an upper position by a rearwardly extending cam bracket 119 having a cam surface 120 and a retaining surface 121, as shown in Fig. 7. We prefer to have the cam bracket 119 bifurcated so that a portion thereof extends to both sides of the sleeve member 117 when the outermost vane section 112 is retracted completely as in the case of the guide vane member 110 shown in Fig. 7. When in this retracted position, the retaining surface 121 overlies and rests upon a pair of cam rollers 122 which are rotatably mounted upon the sleeve bearing 117, as shown. A fixed pin 123 is attached medially to the upper edge of the vane section 115 and is adapted to retain one end of a tension spring 124, the other end being secured at 125 to each side of each of the uprights 65 as shown in Figs. 2, 6 and 7. The outer edge of section 115 in each instance is provided with a castor 126 which is mounted for free rotation thereon and is adapted to contact the inner face of plate 107 at each side of our unloader. Mounted internally of the telescoped vane sections 112, 114 and 115 is a hydraulic ram 127, the rear end thereof being secured at 128 on section 115 and the forward end of the ram plunger 129 being secured to the inside of the forward beveled edge 113 as shown in Fig. 7. Each of the hydraulic rams 127 may be provided with hydraulic supply tubes (not shown) and controlled for extension and retraction in and out of the car doorways 41 and 42 as shown in Figs. 6 and 7. The guide vanes are adapted to operate in penetrating fashion into the bulk material within the boxcar 40 and to meet with the forward beveled edges 113 in apexed relation, as shown in Fig. 6. When the sections of the vanes 111 and 109 are withdrawn from apexed relation, then the vanes 108 and 110 may be similarly extended in oppositely pointed apex as will be presently described.

*Operation*

In the operation and use of our car unloader, and in the practicing of our method of unloading boxcars, the boxcar 40 is pulled or pushed along trackage 11 and into approximate central position with respect to the car supporting and end raising element 24. The motor 55 is then energized to cause the abutments 49 to raise on the inclined track members 63 and in contact with the aligned tracks 61 until the abutting faces 51 of abutment members 49 exactly center the car 40 and maintain the car frame 60 in secure pressing engagement. The motor 55 is then de-energized with the abutment members 49 remaining in their holding relation and the outside car doors 43 having been moved to one side to expose the inner door sections which are nailed over each of the side doorways 41 and 42.

The hydraulic ram 74 is then caused to extend inwardly in converging relation with one another so as to simultaneously move the upright supports 65 inwardly toward the doorways 41 and 42 from the retracted position shown in Fig. 2 to the position shown in Fig. 7. The latch 89 will, of course, be first contacted by the door sections 97 and trip the pressure plate 87 so that it will drop to the floor of car 40 and on continued inward movement of supports 65 will break the door sections loose from the doorways 41 and 42 in sequence from top to bottom at each side, the rollers 104 serving as positioning member to achieve angularity. Since the pressure is equal and opposite, there will be no tilting movement or strain on the framework of boxcar 40 except for the pulling of any fastening means such as nails which may have been applied through the door sections to the inside of the car doorways. As previously noted, the height of car floor 46 may vary from car to car and, hence, the slidable arrangement of the pressure plates is highly useful.

It will be noted that in the inwardly converging movement of the uprights 65, the sleeve bearings 117 affixed at each side of each of the uprights also move forwardly to change the angulation of all of the vane elements 108 through 111 from the position shown in Fig. 2 to that shown in Fig. 6. The rear castors 126 are caused to travel on the inside face of the plate 107 so as to maintain contact therewith during the change in angulation. The tension springs 124 tend to retract the guide vane and maintain the rolling contact between the castors 126 and the plates 107 at each side of car 40.

The hydraulic rams 98 are then retracted sequentially, the one at the left in Figs. 4 and 7 moving upwardly first followed by the one to the right causing the pressure plates 87 to move radially with respect to the axes of shafts 85 and 86. As soon as the door sections are loosened, bulk material such as grain to be unloaded from the car 40 will begin to flow outwardly through the doorways around the door sections. The conveyor mechanism and receiver 14 may be started preliminary to the breaking of the door so that there will not be a surplus of grain piled up in the receiving hopper at the time the car is ultimately unloaded. As soon as the car doors are broken loose and impaled upon the points 105 on each of the pressure plates, the pressure plate to the left in Fig. 7 is swung upwardly while the hydraulic ram 98 is momentarily at rest. As soon as the left pressure plate 87 has reached a horizontal position beneath the ceiling of car 40, the hydraulic ram 98 at the right in Fig. 7 is then caused to retract and raise its corresponding arm and pressure plate into underlying horizontal relation and out of contact with the bulk material to be unloaded. As previously noted, the frame and pressure plate to the left as viewed in Fig. 7, is preferably mounted at a higher position so as to assist the sequential operation and to provide the necessary overlap when the door breaking and retaining mechanism has reached its retaining position.

The uprights 65 remain in proximity to the sides of car 40 with the guide vanes angulated as in Fig. 6. One pair of hydraulic rams 127, such as disposed respectively in the guide vane members 109 and 111 are then caused to extend simultaneously with the vane sections 112 and 114 extending as in Fig. 6. Here again, provision is made for variations in the height of car floors 46 from one conventional boxcar to the other. As the most forwardly moving vane section 112 begins to move toward the inside of car 40, the cam bracket 119 will at first be supported on roller 122 and then will drop off the roller and permit the entire guide vane in each instance to drop downwardly, the shaft 116 sliding downwardly within the sleeve 117 until the bottom edge of the guide vane strikes the car floor 46. The opposed pair of vanes 109 and 111 are then further simultaneously extended until the beveled forward edges 113 come together in an apex pointing to the left as viewed in Fig. 6. The vanes will then lie in a guiding relation completely across car floor 46 with their planes angulated to the transverse perpendicular and in upstanding relation with respect to the car floor 46. The beveled leading edges assist the vanes in penetrating the bulk material which has not already spilled from the doorways 41 and 42 into the receiving and conveying mechanism.

The car supporting and end raising mechanism is then activated at the left as viewed in Fig. 6, hydraulic ram 36 projecting upwardly to tilt car 40, as shown in dotted line in Fig. 1. The shaft 31 toward the other end of the car will remain in pivotal cradled relation with the bearing 33 and thus will permit the lower end of car 40 and the right end of element 24 to swing downwardly into pit 10. The bulk material in the raised end of boxcar 40 will then flow downwardly and outwardly in guided relation against the guide vanes 109 and 111, being approximately equally divided in its flow through both doorways. The unloading operation requires but a few seconds for emptying half of the car 40 and the hydraulic ram 36 is then lowered until the shaft 30 is cradled in bearing 32 at the left as shown in Fig. 1. The vanes 109 and 111 are then caused to retract to their respective rams 127, the cam bracket 119 engaging rollers 122 at cam face 120 and again raising the vanes to the position illustrated by vane 110 at the left in Fig. 7. Guide vanes 108 and 110 are then caused to project in exactly the same manner as the first noted pair of vanes except the direction in which the apex points when the beveled leading edges 113 are closed together. In this instance the apex will be formed to the right and opposite to that shown in Fig. 6. The hydraulic ram 37 is then extended with shaft 30 remaining in cradled relation with bearings 32 and pivotally thereon. The right end of car 40 will then be raised in the same manner as previously noted and the bulk material will be caused to flow from the unloaded upper end downwardly and outwardly in guided relation against vanes 108 and 110.

The car is then lowered to the full line position shown in Fig. 1, and the guide vanes all retracted from the car doorways. The pressure plates 87 are then lowered in reverse sequence, the grain doors being removed or returned to the car as desired. Finally the uprights 65 are simultaneously pulled divergently from the sides of car 40, causing the vanes 108 through 111 to be likewise retracted and in complete clearance with the sides of car 40. Abutments 49 are then retracted into wells 22, the locking bars 52a each bridging gap 22a at the ends of the platform framework 26 in securing relation with the guideways 61a. The empty car may then be removed from the supporting platform 24.

It may thus be seen that we have provided a quick and unique method of removing the doors from such boxcars as are used to transport grain and then to unload the boxcar from both sides thereof, the apparatus devised therefor being adaptable to buildings and pit structures now conventionally used in connection with railroad trackage.

It will, of course, be understood that various changes may be made in the form, detail, arrangement and proportions of the parts without departing from the scope of our invention.

What we claimed is:

1. An unloader for material contained in a railroad boxcar having conventional doorways disposed one at each side thereof and in overlying relationship with a pit having a material receiving and conveying device located therein, said unloader comprising means for supporting and tilting said boxcar in endwise direction only, upstanding mounting means at each side of said boxcar adapted to tilt relatively to the tilting movement of said car, a compact guiding vane supported on each of the upstanding mounting means, each of said guiding vanes being composed of telescoping members having straight bottom edges and the forwardmost of the telescoping members being provided with an upstanding straight leading edge, means orienting each of said guiding vanes to the same angle at opposed sides of the longitudinal center line of said boxcar and means adapted to project the telescoping guiding vanes at the said angle to penetrate the material and bring said forward straight edges into substantial closure whereby to form an apex to divide said material and deflect it in balanced relation downwardly and outwardly through both of said doorways when the boxcar is tilted upwardly in the apexed direction of the guiding vanes.

2. The subject matter of claim 1 wherein each of said telescoping vanes is pivotally mounted adjacent its outer extremity to the supporting structure for radial angulation thereabout prior to projecting the telescoping vanes and penetrating the material.

3. In an unloader having endwise tiltability for removing bulk material from boxcars through open opposed side doors, the improvement which comprises, a supporting structure at each side of the unloader and in close spaced clearance with the side doors of the boxcar, a pair of extensible and expansible guiding vanes mounted on each of said mounting means, each of said guiding vanes having a lower straight edge and an upstanding leading edge intersecting therewith and one of said pairs of vanes being movable in angulated relation through a doorway with the lower straight edge in contact with the floor surface of the boxcar, said other supporting structure having a duplicate pair of vanes one of which is movable in the same manner and at the same angle with respect to the other side of the boxcar, said vanes when so moved having their forward straight edges in apexed and abutting relation for dividing and deflecting downwardly and outwardly the bulk material disposed in the end of the boxcar lying forwardly of said apex when tilted upwardly to completely remove the bulk material from that end, said vanes then being retractable and contractable to their original positions and the other of each of said pairs of vanes then being movable in a like manner to form an apex pointed in the opposite direction for removing the remainder of the bulk material from the boxcar upon upward tilting of the other end thereof.

4. The structure of claim 3 and a cam bracket on each of said vanes, each cam bracket having a horizontal track surface and an upwardly inclined cam surface, and a plurality of cam rollers rotatably supported on said supporting structure, each adapted to support a vane and cam bracket whereby each vane upon extension will ride on said cam roller and upon reaching the inclined cam surface will drop down to contact the floor of the boxcar irrespective of the height of the car floor.

References Cited in the file of this patent

UNITED STATES PATENTS

| | | |
|---|---|---|
| 814,610 | Lefferts | Mar. 6, 1906 |
| 1,451,748 | Vaughan et al. | Apr. 17, 1923 |
| 1,542,951 | Perkins | June 23, 1925 |
| 2,641,355 | Hudson | June 9, 1953 |